US008416662B2

(12) United States Patent
Yu et al.

(10) Patent No.: US 8,416,662 B2
(45) Date of Patent: Apr. 9, 2013

(54) OPTICAL DISC DRIVE AND METHOD FOR DETECTING VERTICAL DEVIATION THEREON

(75) Inventors: Chi-Fan Yu, Tu-Cheng (TW); I-Chun Tseng, Tu-Cheng (TW); Kun-Hua Lu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/047,772

(22) Filed: Mar. 14, 2011

(65) Prior Publication Data
US 2011/0235486 A1    Sep. 29, 2011

(30) Foreign Application Priority Data
Mar. 23, 2010 (TW) ............................... 99108596 A (51) Int. Cl.
*G11B 7/00* (2006.01)
(52) U.S. Cl. ............... 369/53.19; 369/53.23; 369/53.28; 369/94
(58) Field of Classification Search ............... 369/53.12, 369/53.19, 53.23, 53.28, 94
See application file for complete search history.

(56) References Cited

U.S. PATENT DOCUMENTS

| 7,184,373 | B2 * | 2/2007 | Kelbas et al. | 369/44.26 |
|---|---|---|---|---|
| 7,224,655 | B2 * | 5/2007 | Choi | 369/53.19 |
| 7,263,041 | B2 * | 8/2007 | Lin et al. | 369/44.32 |
| 2005/0058036 | A1 * | 3/2005 | Chen et al. | 369/53.2 |
| 2005/0068859 | A1 * | 3/2005 | Park et al. | 369/44.25 |
| 2005/0254360 | A1 * | 11/2005 | Sameshima et al. | 369/44.23 |
| 2006/0158974 | A1 * | 7/2006 | Kobayashi et al. | 369/44.32 |
| 2007/0070850 | A1 * | 3/2007 | Watanabe et al. | 369/53.22 |
| 2007/0097823 | A1 * | 5/2007 | Wu et al. | 369/53.23 |
| 2010/0034069 | A1 * | 2/2010 | Yu et al. | 369/53.23 |
| 2011/0007613 | A1 * | 1/2011 | Ito et al. | 369/44.11 |

* cited by examiner

*Primary Examiner* — Thomas Alunkal
(74) *Attorney, Agent, or Firm* — Altis Law Group, Inc.

(57) ABSTRACT

An optical disc drive includes a disc holder, a pickup head, a focus servo, an S-curve identifying unit, a first counter, a second counter, a judging unit, a disc identifying unit, and a system controller. The optical disc drive can detect whether a disc exhibits vertical deviation. Upon detection, the optical disc drive restricts the maximum speed of data reading and writing. The judging unit determines whether the disc exhibits vertical deviation based on a comparison result of the number of the one or more S curves with a first preset value.

2 Claims, 8 Drawing Sheets

OPTICAL DISC DRIVE AND METHOD FOR DETECTING VERTICAL DEVIATION THEREON

BACKGROUND

1. Technical Field

The present disclosure relates to an optical disc drive and a method for detecting vertical deviation on the drive.

2. Description of Related Arts

Figure 1:
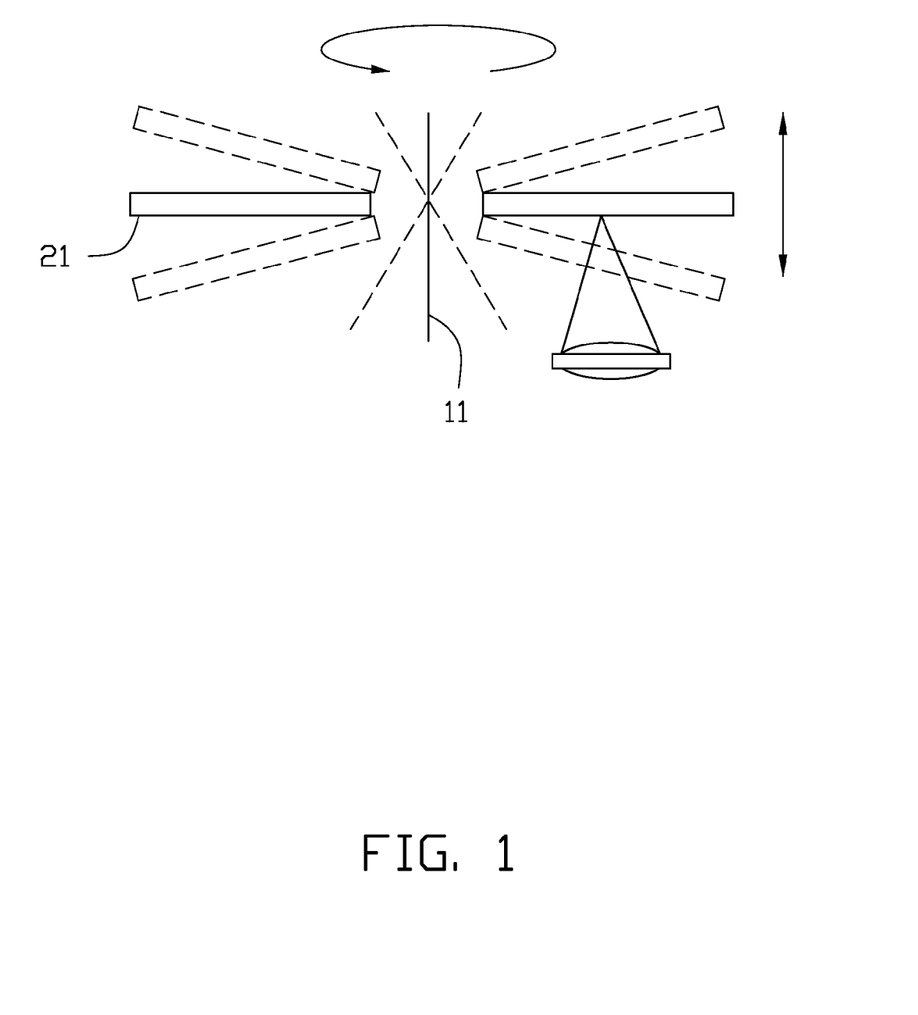
FIG. 1 is a schematic planar view of a disc exhibiting vertical deviation.

FIG. 1 is a schematic planar view of a disc exhibiting vertical deviation, in which an optical disc 21, travels along the perpendicular axis 11 of the rotation plane of disc 21 in an optical disc drive. Such vertical deviation can impair data reading and writing, and generate unwanted noise during operation. Vertical deviation frequently happens in poor quality discs. It is therefore desirable to provide an optical disc drive and method to detect vertical deviation on the drive to address the limitations described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail below, with reference to the accompanying drawings.

Figure 2:
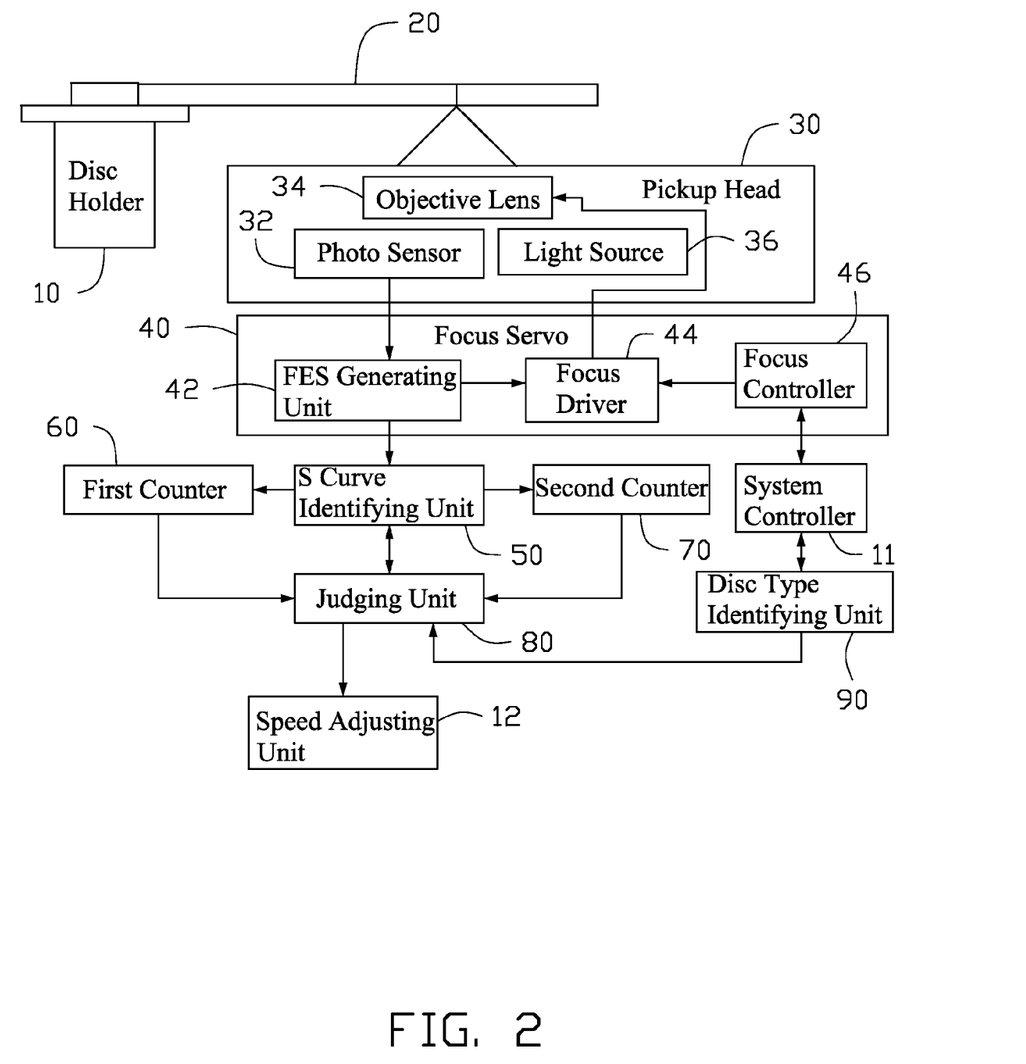
FIG. 2 is a schematic block diagram of an optical disc drive in accordance with an embodiment.

Referring to FIG. 2, an optical disc drive 100 includes a disc holder 10, a pickup head 30, a focus servo 40, an S-curve identifying unit 50, a first counter 60, a second counter 70, a judging unit 80, a disc identifying unit 90, and a system controller 11. The optical disc drive 100 can detect whether a disc 20 exhibits vertical deviation. Upon detecting the deviation, the optical disc drive 100 limits the maximum speed of data reading and writing, to reduce the noise and to enhance the stability of data reading or data writing. In the embodiment, the optical disc drive 100 may be a DVD reading/writing device, a blue ray disc reading/writing device, and the like.

The disc holder 10 is used to hold the disc 20 at a horizontal level. The pickup head 30 is used for reading data on the optical disc 20. The pickup head 30 includes a light source 36, a photo sensor 32, and an objective lens 34. The light source 36 can be a laser diode that emits light beam of a specific wavelength to read the data on the optical disc 20.

Figure 3:
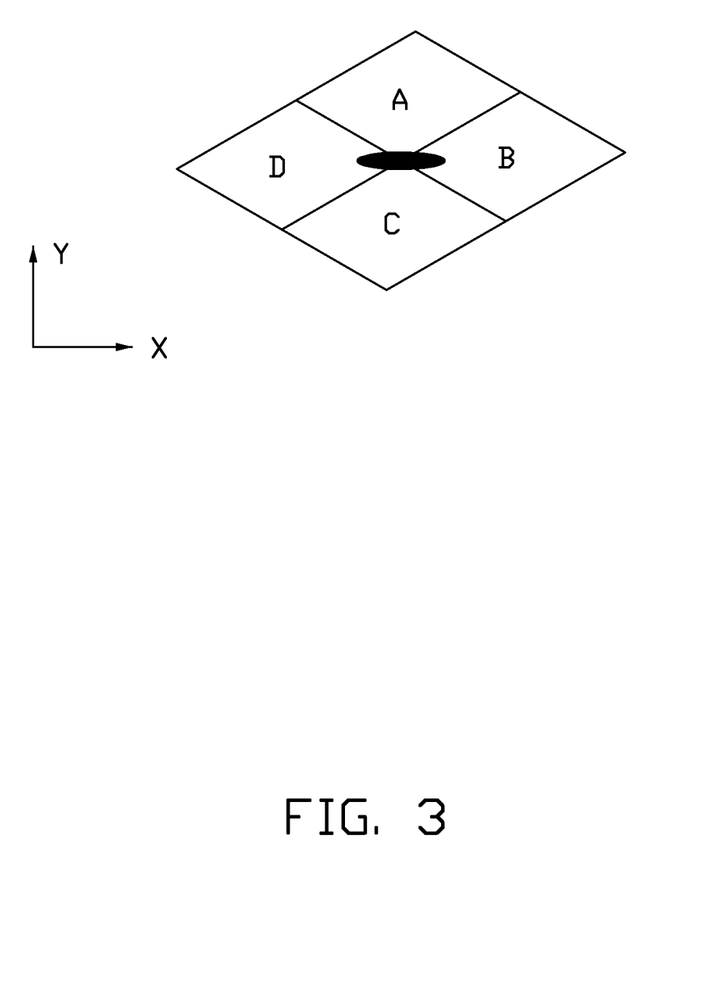
FIGS. 3-5 including show different light spots formed on a photo sensor of the disc drive of FIG. 2.
Figure 4:
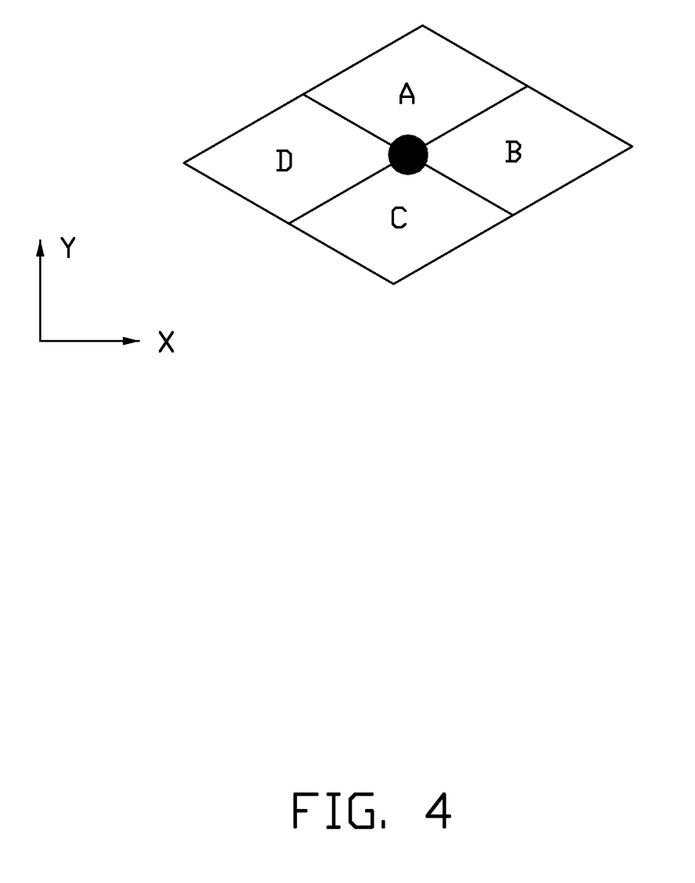
Figure 5:
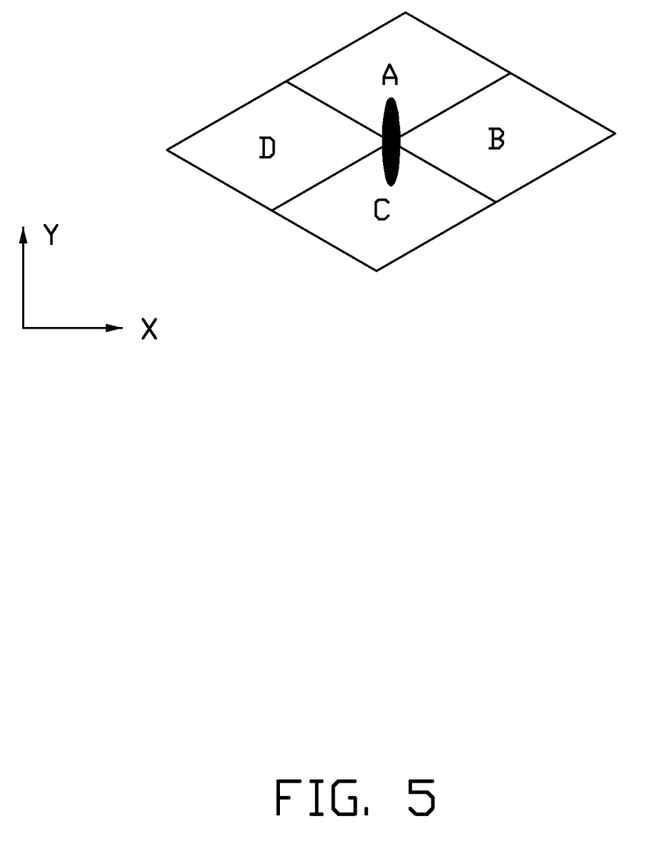

When the disc 20 is loaded, the objective lens 34 is alternatively moved toward and away from the disc 20 for focusing the light beam from the laser diode 34 on the signal recording layer of the optical disc 20. When the focus point of the light beam from the laser diode 34 is on the recording layer of the disc 20, the reflected beam forms a spot on the photo sensor 32. As shown in FIG. 4, the spot is a circular light spot (equal length in X and Y axis) on detection segments A, B, C, and D of the sensor 32. As shown in FIG. 5, when the focus point of the light beam from the laser diode 34 is near and in the rear of the recording layer of the disc 20, the formed spot on the sensor 32 is an oval light spot (longer length in Y axis and shorter length in X axis) on detection segments A, B, C, and D of the sensor 32. As shown in FIG. 3, when the focus point of the light beam from the laser diode 36 is away from and in the front of the recording layer of the disc 20, the formed spot on the sensor 32 is an oval light spot (longer length in X axis and shorter length in Y axis) on detection segments A, B, C, and D of the sensor 32.

The focusing servo 40 includes a focus error signal (FES) generating unit 42, a focus driver 44, and a focus controller 46. The focus controller 46 moves the lens 34 with respect to the disc 20 between an uppermost position and a lowermost position. In the embodiment, when the disc 20 is loaded, the lens 34 is first moved to the lowermost position (phase 1), and then to the uppermost position (phase 2), and finally again to the lowermost position (phase 3).

Figure 6:
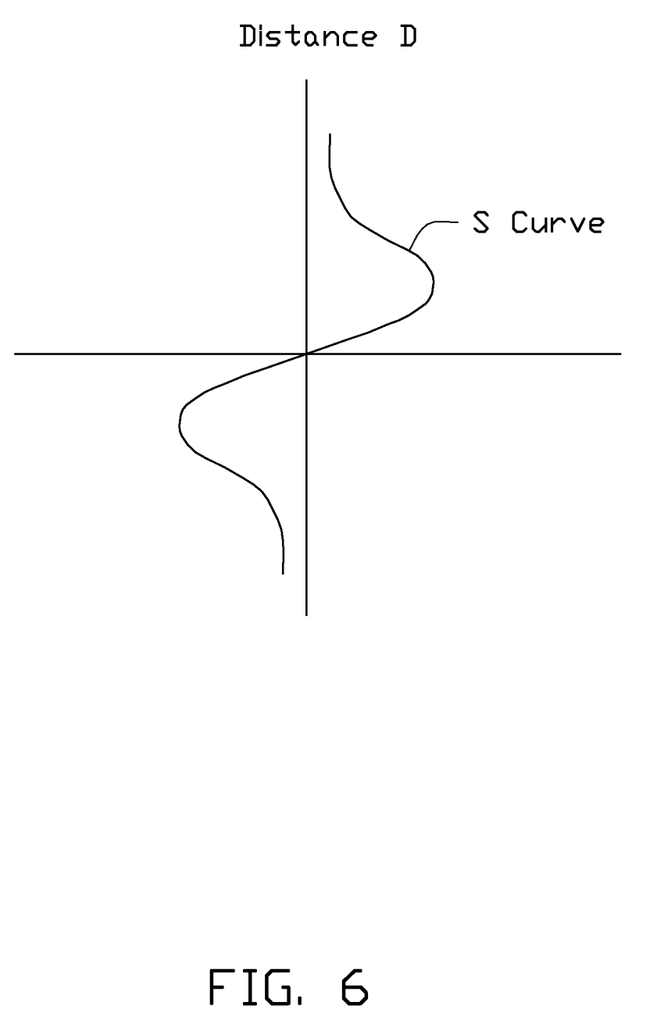
FIG. 6 shows an S curve in a waveform of a focus error signal.

The FES generating unit 42 receives signals from the photo sensor 32 and generates focus error signals. In the embodiment, a difference amplifier subtracts voltage signals outputted by the detection segments A and C from voltage signals outputted by the detection segments B and D, and then obtains the voltage value of the focus error signal. The voltage value of the focus error signal is related to the distance D between the actual position of the lens 34 and the in-focus position. The in-focus position is a position of the lens 34 where the focal point of the lens coincides with the signal recording layer of the optical disc 20. During the alternative moving of the lens 34 between the uppermost position and the lowermost position, one or more s-shaped curves, known as S curve, appear in a waveform of the focus error signal.

The S-curve identifying unit 50 is connected to and receives signals from the FES generating unit 42 to identify whether an S curve appears. The first counter 60 is used to count the number of the S curve when the lens 34 moves in the phase 2. The second counter 70 is used to count the number of the S curve when the lens 34 moves in the phase 3. The disc identifying unit 90 is used to identify the type of the disc 20. The type of the disc 20 here refers to single layer disc or dual layer disc.

After the type of the disc 20 has been determined, the judging unit 80 determines whether the disc 20 is a deviation disc based on the number of the S curves in the phases 2 and 3. According to a test, for a normal single layer disc, the number of the S curves in the phases 2 and 3 is one. For a normal dual layer disc, the number of the S curves in the phase 2 is no more than five, and the number in the phase 3 is one. Therefore, for example, for a dual layer disc, if the numbers of the S curves in the phases 2 and 3 are respectively greater than 5 and 1, the judging unit 80 determines that the disc exhibits vertical deviation. In the embodiment, the optical disc drive 100 further includes a spinning speed adjusting unit 12 used to restrict the maximum speed of the spindle motor that spins the disc 20, to enhance the stability of data reading or data writing.

Figure 7A:
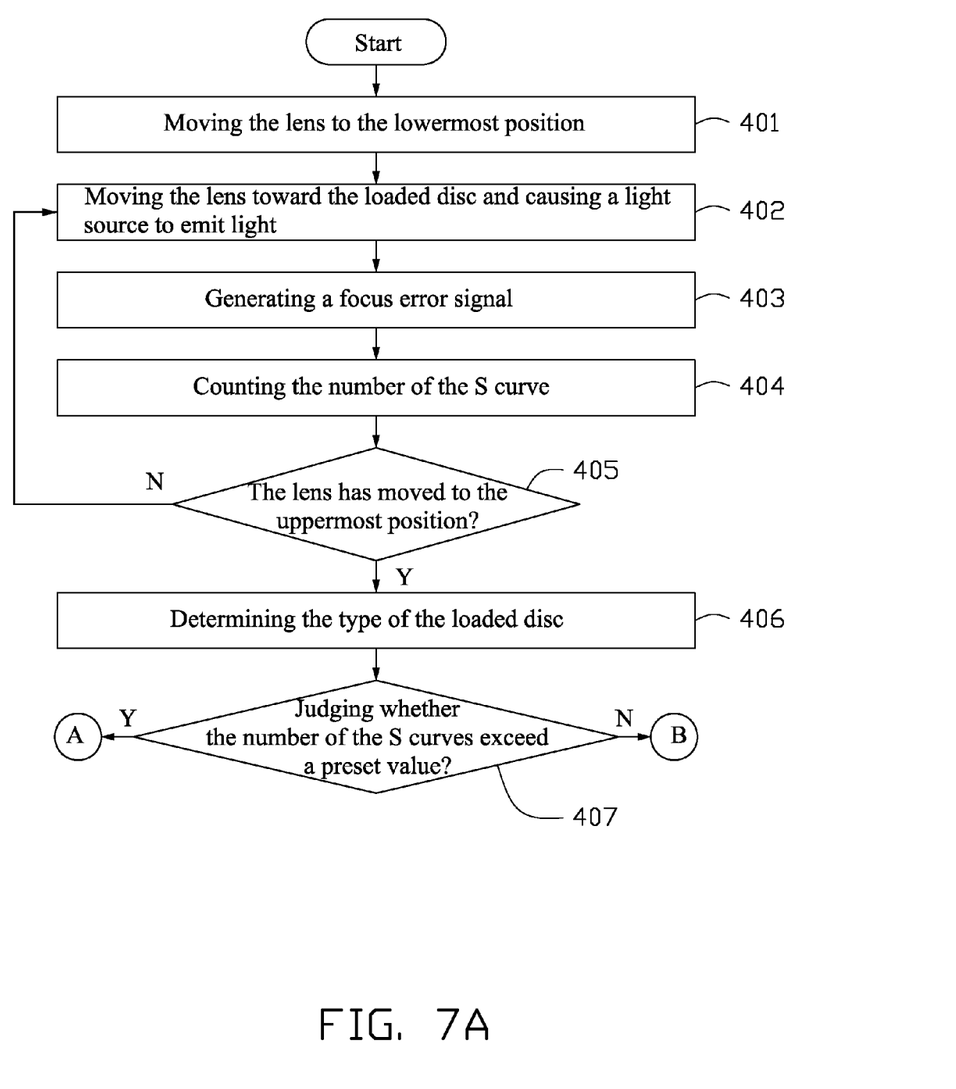
FIGS. 7A-7B show a flowchart of a method for detecting vertical deviation in a disc, according to an embodiment.
Figure 7B:
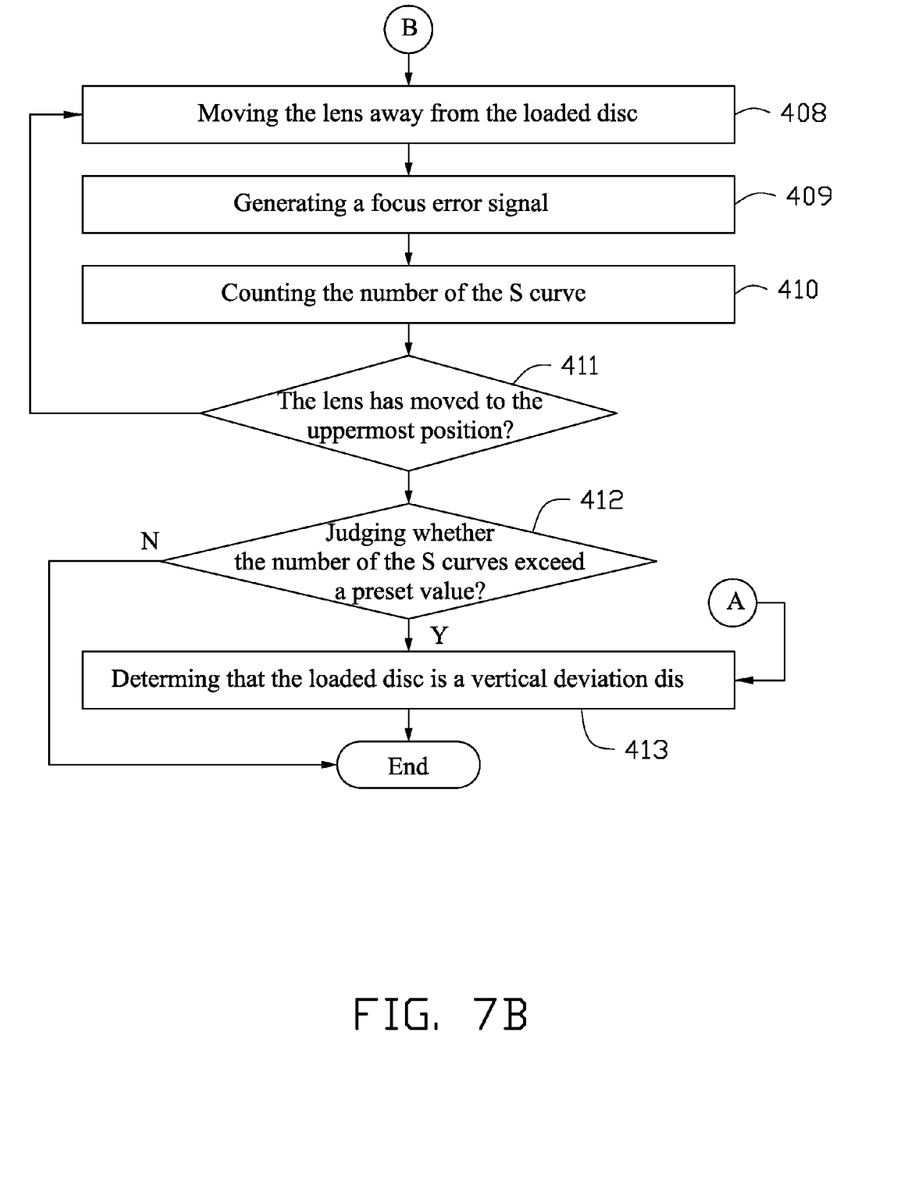

FIGS. 7A and 7B show a flowchart of a method, implemented by the disc drive 100, for detecting a vertical deviation disc. In step 401, the focus driver 44 is controlled to move the objective lens 34 to the lowermost position when the disc 20 is loaded. In step 402, the focus driver 44 is controlled to move the objective lens 34 toward the disc 20 and the laser diode 36 is controlled to emit light. In step 403, the FES generating unit 42 generates a focus error signal based on the signal received from the photo sensor 32. In step 404, the first counter 60 counts the number of the S curves. In step 405, the focus controller 46 determines whether the lens 34 has moved to the uppermost position. If so, the procedure goes to step 406, otherwise, the procedure returns back to the step 402. In step 406, the disc identifying unit 90 determines the type of the disc 20. In step 407, the judging unit 80 determines whether the number of the S curves exceed a preset value. If so, the judging unit 80 determines that the disc 20 is a disc deviation disc, otherwise, the procedure goes to step 408. In step 408, the focus controller 46 controls the focus driver 44 to move the lens 34 away from the disc 20. In step 409, the FES generating unit 42 generates a focus error signal based on the signal received from the photo sensor 32. In step 410, the second counter 70 counts the number of the S curves. In step 411, the focus controller 46 determines whether the lens 34 has moved to the lowermost position. If so, the procedure goes to step 412, otherwise, the procedure returns back to the step 408. In step 412, the judging unit 80 determines whether the number of the S curves exceed a preset value. If so, the judging unit 80 determines that the disc 20 exhibits vertical deviation, otherwise, the procedure ends.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. An optical disc drive comprising:
    a disc holder to hold a disc;
    a pickup head comprising a light source, a photo sensor, and an objective lens, the light source to emit light to pass through the objective lens and project on the disc, the photo sensor to detect reflected light reflected by the disc;
    a focus servo comprising a focus error signal (FES) generating unit, a focus driver, and a focus controller, the FES generating unit to generate a focus error signal according to a signal from the photo sensor, the focus driver to drive the objective lens to move with respect to the disc between an uppermost position and a lowermost position, the focus controller to control the focus driver to drive the objective lens;
    an S-curve identifying unit to determine whether one or more S curves appear in a waveform of the focus error signal when the lens moves from the lowermost position to the uppermost position;
    a counter to count the number of the one or more S curves;
    a judging unit to determine whether the disc exhibits vertical deviation based on a comparison result of the number of the one or more S curves with a first preset value; and
    a disc identifying unit to determine the type of the disc;
    wherein when the number of the one or more S curves is no more than the first preset value, the focus controller controls the focus driver to drive the lens to move from the uppermost position to the lowermost position, the counter counts the number of S curves appearing when the lens moves from the uppermost position to the lowermost position, and the judging unit is configured to determine whether the disc exhibits vertical deviation based on a comparison result of the number of the S curves appearing when the lens moves from the uppermost position to the lowermost position with a second preset value; and
    the judging unit is configured to determine the first preset value and the second preset value based on the type of the disc.

2. The optical disc drive according to claim 1, wherein the type of the disc comprises a single layer disc and a dual layer disc.

* * * * *